Oct. 29, 1957   F. L. MANGOLD ET AL   2,811,221
APPARATUS FOR MAINTAINING LOW OXYGEN
ATMOSPHERES IN CLOSED VESSELS
Filed March 9, 1954
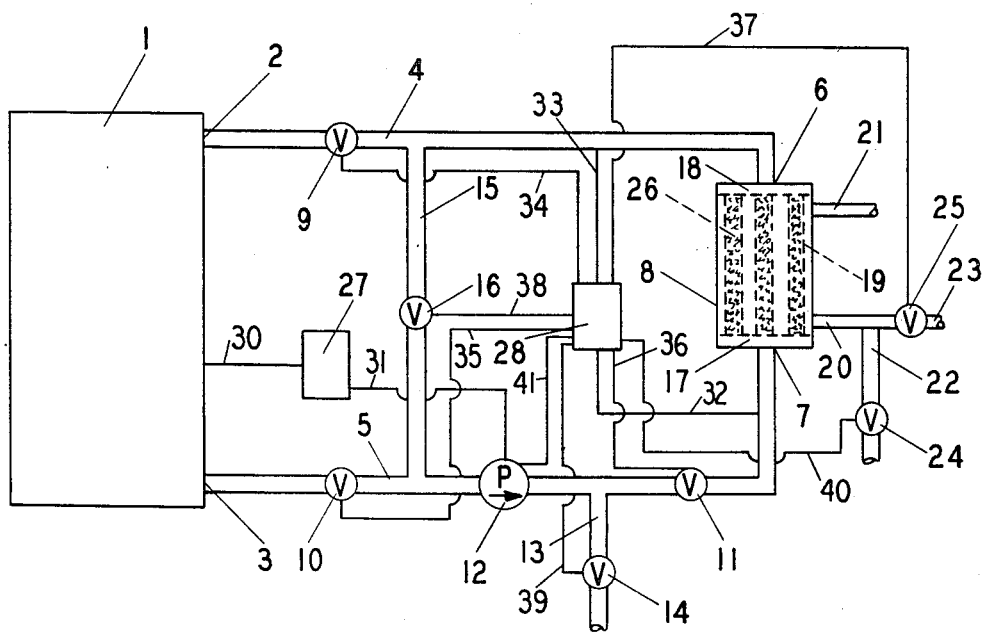
Robert A. Tidball
Francis L. Mangold
INVENTORS
BY Neal J Moseley
their Attorney United States Patent Office 2,811,221
Patented Oct. 29, 1957

2,811,221

APPARATUS FOR MAINTAINING LOW OXYGEN ATMOSPHERES IN CLOSED VESSELS

Francis L. Mangold, Belleview, and Robert A. Tidball, Evans City, Pa., assignors to Mine Safety Appliances Company, Pittsburgh, Pa., a corporation of Pennsylvania Application March 9, 1954, Serial No. 415,014

1 Claim. (Cl. 183—4.1)

This invention relates to new and useful improvements in methods and apparatus for maintaining low oxygen atmospheres in closed vessels.

It has been found in handling certain spontaneously inflammable substances such as liquid sodium and sodium-potassium alloys that almost 90 percent of fire damage occurs within the first few seconds of a fire and before the fire fighting apparatus can go into operation. It has also been found that in the case of sodium and sodium-potassium alloys spontaneous combustion can be eliminated if the oxygen content of the atmosphere surrounding containers holding such materials is kept below a value of about 7 percent. Other spontaneously inflammable materials also have minimum oxygen requirements for spontaneous combustion.

It is therefore one object of this invention to provide a new and improved method of preventing fires in spontaneously inflammable substances by maintaining the oxygen content of the surrounding atmosphere below the minimum concentration required for spontaneous combustion.

Another object of this invention is to maintain a low oxygen atmosphere in a closed vessel by circulating said atmosphere over an oxygen absorbent in a second vessel to maintain the oxygen content of the atmosphere at a predetermined low value.

Another object is to provide a new and improved apparatus for maintaining a low oxygen atmosphere in a closed vessel which includes a means for reversibly absorbing molecular oxygen and a means for circulating the atmosphere from said closed cessel over said oxygen absorbent.

Other objects of this invention will become apparent from time to time throughout the specification and claim as hereinafter related.

This invention comprises the new and improved method and the new and improved apparatus for performing said method which will be described more fully hereinafter and the novelty of which will be particularly pointed out and distinctly claimed.

In the accompanying drawings there is shown diagrammatically an apparatus for performing the method disclosed and claimed as this invention.

Referring to the drawings by numerals of reference there is shown diagrammatically a closed vessel 1 which encloses an atmosphere and which includes a spontaneously inflammable substance such as sodium or sodium-potassium alloy. The inflammable substance in the closed vessel 1 may be enclosed in containers, pipes, conduits or other apparatus for handling and using said material. The vessel 1 has an inlet 2 and an outlet 3 connected by conduits 4 and 5, respectively, to the outlet 6 and inlet 7, respectively, of a second closed vessel 8. The conduit 4 is provided with a valve 9 which may be automatically operated if desired. The valve 9 is preferably one which is opened a predetermined small amount to provide a throttling of the atmosphere discharged from the vessel 8 into the vessel 1. The valve 9 is also arranged to be fully closed for shutting off the flow into the closed vessel 1. The conduit 5 is provided with valves 10 and 11 for controlling flow through the conduit in a manner which will be hereinafter described. The conduit 5 is also provided with a pump 12 which is operable to compress gases from the vessel 1 and to discharge said gases under compression into the vessel 8. There is also provided an outlet conduit 13 from the conduit 5 between the pump 12 and the valve 11 and having a normally closed valve 14 therein. A by-pass conduit 15 is connected from the conduit 4 to the conduit 5 at a point on the inlet side of the pump 12. The by-pass conduit 15 is provided with a normally closed valve 16.

The second closed vessel 8 is preferably a shell and tube type heat exchanger. The inlet 7 and outlet 6 to which the conduits 5 and 4 are connected open into the headers 17 and 18 for the heat exchange tubes 19. The shell portion of the vessel 8 has inlet and outlet conduits 20 and 21 for circulating a heating or cooling fluid over the tubes 19. The inlet conduit 20 to the shell 8 is provided with branch conduits 22 and 23 for supplying heating and cooling fluids respectively and having valves 24 and 25 which are alternately opened according to the requirements of the apparatus for heating or cooling. The tubes 19 of the vessel 8 are packed with an oxygen absorbing material indicated diagrammatically as 26. The oxygen absorbing material used in this apparatus is preferably a reversible absorbent of molecular oxygen which absorbs oxygen readily when cooled and placed under pressure and which is readily desorbed by subjection to heat and evacuation. The most readily available reversible oxygen absorbent is cobalt (II) bis salicylal ethylene diimine, commonly known as salcomine. Other reversible oxygen absorbents are certain derivatives of salcomine, such as; fluomine, cobalt (II) bis 3-fluoro salicylal ethylene diimine; methomine, cobalt (II) bis 3-methoxy salicylal ethylene diimine; ethomine, cobalt (II) bis 3-ethoxy salicylal ethylene diimine; and nitromine, cobalt (II) bis 3-nitro salicylal ethylene diimine. Some other reversible absorbents of molecular oxygen are the cobalt (II)-histidine chelate, and the iron-2 indigo chelate. The various compounds which have been mentioned as reversible carriers or absorbents for molecular oxygen all have the common property of being metal-organic chelates. The iron-2 indigo chelate and certain of the salcomine derivatives are more efficient oxygen absorbents than is salcomine. Salcomine, however, has the advantage that it easier to manufacture and is considerably less expensive than the other derivatives thereof which are somewhat more efficient in their absorption of oxygen.

*Operation*

In the operation of this apparatus and method the valves 9, 10, 11 and 25 are initially open and the valves 16, 14 and 24 are initially closed. The pump 12 is operating to circulate a portion of the atmosphere from the enclosed vessel 1 in the direction of the directional arrow for the pump. The pump 12 is operable to withdraw a portion of the atmosphere from the closed vessel 1 and compress it to a substantial super-atmospheric pressure and to discharge this atmosphere under pressure into the tube inlet portion of the second closed vessel 8. The compressed atmosphere portion is circulated through the various heat exchange tubes 19 which contain the oxygen absorbent which may be any of the chemicals enumerated above. The tubes 19 in the vessel 8 are cooled by the continuous circulation of a cooling fluid through the conduits 23 and 21. This cooling of the tubes 19 serve to increase the oxygen absorbing capacity and prolongs the effective "life" of the oxygen absorbing substance contained in the tubes. The atmospheric portion which has passed through the tubes 19 and had a portion of the oxygen removed therefrom is discharged through the conduit 4 back to inlet 2 of the closed vessel 1. The conduit 4 has an expansion device or valve 9 therein which is set to provide a throttling of the low oxygen atmosphere back to the pressure in the closed vessel 1.

When the oxygen absorbing substance 26 in the tubes 19 has become saturated with absorbed oxygen it becomes necessary to remove the oxygen therefrom. The valves 9, 10, 11 and 25 are closed and the valves 16, 14 and 24 are open for desorption of the oxygen absorbing substance 26. With valve 25 closed and valve 24 open a heating fluid is circulated over the heat exchange tubes 19 thus heating the oxygen absorbing material and causing it to give up the absorbed oxygen. With the valves 9, 10, and 11 closed and the valves 14 and 16 open and the pump operating in the direction of the directional arrow the pump will be drawing gases through from the outlet 6 of the vessel 8 through the conduit 4 and the conduit 15 past the open valve 16 and discharging said gases through the outlet conduit 13 and past the open valve 14. The pump 12 therefore is operated as an evacuating pump during the desorption of the oxygen absorbing material. It is preferred that the vessel 8 and the oxygen absorbent 26 be subjected to evacuation before heat is supplied thereto. This order of application of reduced pressure and heat is effective to prolong the life of the absorbent. After the oxygen absorbing material has been subjected to heat and evacuation for the desired period of time the various valves may be restored to their desired positions for operation of an absorption cycle. At the end of a desorption cycle it is preferred that the absorbent 26 be cooled before it is again subjected to high pressure. When the valves are restored to the previously described positions the valves 9, 10, 11 and 25 open and the valves 14, 16 and 24 close and the pump operating as described the apparatus is again in condition for circulating the atmosphere from the closed vessel 1 over the oxygen absorbing material 26 for removal of oxygen from said atmosphere.

If it is desired, it would be within the contemplation of this invention to make the operation of the various valves and the pump fully automatic according to the desired operating conditions. For example the pump could be operated by a controller of a conventional type which would be responsive to the oxygen concentration in the vessel 1 and which would turn the pump 12 on when the oxygen concentration reached a predetermined maximum value and which would shut the pump down when the oxygen concentration reached a predetermined minimum value. Similarly a controller could be used which would measure the differential in oxygen concentration between the inlet 7 and the outlet 6 of the heat exchange vessel 8 and which would therefore be responsive to the degree of saturation of the oxygen absorbing material 26. When the oxygen absorbing material reached a predetermined degree of saturation as indicated by a predetermined minimum differential of oxygen concentration between the inlet and outlet of the vessel 8 the various valves would be operated to place the apparatus in condition for desorbing operation. It should be understood that because of the fact that the various valves are operated between opened and closed positions and the pump is similarly operated between on and off positions the automatic control of this apparatus would be simple to effect with conventional control equipment. The various valves would be electrically operated valves operating between open and closed positions and the pump would be controlled by a simple on and off switch.

For purposes of illustration, the automatic controls which could be used for the apparatus can be illustrated diagrammatically to include a controller 27, which senses the oxygen concentration in the closed vessel 1 through a sensing means (not shown) which is operatively connected to the controller through line 30. A line 31 is provided from controller 27 to pump 12 through which the pump can be started or stopped, as needed.

Similarly, a controller 28 can be provided which is responsive, as previously described, to the differential of oxygen concentration on the inlet and outlet sides of the oxygen absorber vessel 8 through lines 32 and 33, respectively. When the differential of oxygen concentration is above a predetermined value (thus indicating that the oxygen absorbent 26 has a high capacity) the controller 28 would be in a position causing the valves 9, 10, 11 and 25, as controlled via lines 34, 35, 36 and 37, respectively, to be opened and valves 16, 14 and 24, as controlled via lines 38, 39 and 40, to be closed. When the differential of oxygen concentration sensed by the controller 28 drops below a predetermined value (thus indicating that the oxygen absorbent is approaching saturation) the controller 28 would operate to close valves 9, 10, 11 and 25 and to open valves 14, 16 and 24 and to turn on the pump 12, through line 41, independently of the controller 27. With the valves in the operative position just described and with the pump operating, a heating fluid, for example, would circulate through the heat exchange tubes 19 thus heating the absorbent to desorb the oxygen therefrom. Desorbed oxygen would flow through outlet 6, conduits 15 and 13 to the atmosphere under the exhausting action of the pump. In this manner it can be seen that the absorbing vessel 8 may be isolated from the system during desorbing operations.

In normal operation this apparatus would be operated through a relatively large number of absorption and desorption cycles to bring the atmosphere in the closed vessel 1 down to the range which is desired for the purposes of fire prevention. In the case of sodium and sodium-potassium alloys this oxygen concentration is in a range less than 7 percent and preferably in the range of 4 to 5 percent. When the oxygen concentration reaches the desired range the apparatus is then operated periodically to maintain oxygen concentration in that range and to overcome leakage of oxygen into the vessel from the surrounding atmosphere.

While we have described fully and completely the preferred embodiment of our invention it is to be understood that within the scope of the appended claim our invention may be practiced otherwise than as specifically described.

Having thus described our invention what we desire to claim and secure by Letters Patent is:

Apparatus for maintaining a low oxygen content in a closed vessel comprising, in combination with a closed vessel, a second closed vessel, a first conduit means interconnecting said vessels, a second conduit means interconnecting said vessels, pumping means in said first conduit to pump gas from said first vessel to said second vessel, means responsive to the oxygen content in said first vessel for actuating said pumping means whereby gas from said first vessel may be withdrawn therefrom in response to an indication of excessive oxygen therein, a reversible oxygen absorbent in said second vessel, valve means in each of said conduits, heating means to heat said absorbent in said second vessel, and means to vent gas from said second vessel to the atmosphere, and means responsive to the oxygen content entering and leaving said second vessel adapted to operate said valves in said first and said second conduits and to operate said heating means and said vent means whereby when the oxygen content exiting said second vessel indicates a low efficiency of said absorbent the second vessel is isolated from circulation with said first vessel and the absorbent is revivified by being heated to desorb oxygen absorbed thereon.

References Cited in the file of this patent

UNITED STATES PATENTS

| | | |
|---|---|---|
| 184,857 | Garfield | Nov. 28, 1876 |
| 999,870 | Randall | Aug. 8, 1911 |

(Other references on following page)

UNITED STATES PATENTS

| | | |
|---|---|---|
| 1,439,451 | Seibert et al. | Dec. 19, 1922 |
| 1,557,092 | Rodman | Oct. 13, 1925 |
| 1,566,944 | Wilson | Dec. 22, 1925 |
| 1,881,510 | Greenwood | Oct. 11, 1932 |
| 2,049,987 | Willenborg | Aug. 4, 1936 |
| 2,130,163 | Tiddy et al. | Sept. 13, 1938 |
| 2,434,419 | Laughlin et al. | Jan. 13, 1948 |
| 2,664,171 | Lawler | Dec. 29, 1953 |

OTHER REFERENCES

The Condensed Chemical Dictionary, Reinhold Publishing Corp., New York, N. Y., 4th edition (1950), p. 578.